United States Patent
Thompson et al.

(10) Patent No.: US 8,897,353 B2
(45) Date of Patent: Nov. 25, 2014

(54) BLOCK TIME DOMAIN CHANNEL ESTIMATION IN OFDM SYSTEM

(71) Applicants: Steven C Thompson, San Diego, CA (US); Fernando Lopez de Victoria, San Francisco, CA (US)

(72) Inventors: Steven C Thompson, San Diego, CA (US); Fernando Lopez de Victoria, San Francisco, CA (US)

(73) Assignee: Acorn Technologies, Inc., La Jolla, CA (US)

(*) Notice: Subject to any disclaimer, the term of this patent is extended or adjusted under 35 U.S.C. 154(b) by 0 days.

(21) Appl. No.: 13/835,305

(22) Filed: Mar. 15, 2013

(65) Prior Publication Data

US 2014/0269882 A1    Sep. 18, 2014

(51) Int. Cl.
*H03H 7/30* (2006.01)
*H04L 25/02* (2006.01)

(52) U.S. Cl.
CPC ................. *H04L 25/0212* (2013.01)
USPC ........... 375/232; 375/316; 375/261; 375/324; 375/350; 375/148; 375/260; 375/219; 375/227; 375/340

(58) Field of Classification Search
CPC . H04L 27/2647; H04L 5/0007; H04L 5/0048; H04L 1/0026; H04L 5/0023; H04L 1/0045; H04L 25/0232; H04L 27/2628; H04L 27/2636; H04L 25/0234; H04L 25/03159; H04L 25/03949; H04J 11/0036
USPC ......... 375/232, 316, 261, 324, 350, 148, 260, 375/219, 227, 340
See application file for complete search history.

(56) References Cited

U.S. PATENT DOCUMENTS

| | | |
|---|---|---|
| 6,219,334 B1 | 4/2001 | Sato et al. |
| 7,039,136 B2 | 5/2006 | Olson et al. |
| 7,099,270 B2 | 8/2006 | Yamaguchi |
| 7,289,049 B1 | 10/2007 | Fudge et al. |
| 7,394,876 B2 | 7/2008 | Sestok, IV et al. |
| 7,609,616 B2 | 10/2009 | Jacobsen |
| 7,639,738 B2 | 12/2009 | Lopez de Victoria |

(Continued)

FOREIGN PATENT DOCUMENTS

| | | |
|---|---|---|
| CN | 101127753 A | 2/2008 |
| JP | 2007-515899 | 6/2007 |

(Continued)

OTHER PUBLICATIONS

International Search Report, International Appln. No. PCT/US2012/062094, Mar. 25, 2013.

(Continued)

*Primary Examiner* — Dhaval Patel
(74) *Attorney, Agent, or Firm* — Orrick, Herrington & Sutcliffe LLP

(57) ABSTRACT

An OFDM receiver receives OFDM symbols in the frequency domain and comb filters and then punctures the OFDM symbols to leave symbols with actual pilot information and with null values at the data symbols. The receiver provides the punctured OFDM symbols to an OFDM symbol queue. A virtual pilot interpolator is coupled to the punctured OFDM symbol storage to generate virtual pilot information introduced to OFDM symbols. The interpolator may be a two dimensional Wiener filter. The receiver also includes a time domain channel estimator that processes a first OFDM symbol including virtual pilot information to generate a channel impulse response for the first OFDM symbol. A frequency equalizer equalizes the OFDM symbol in response to the channel impulse response for the first OFDM symbol.

20 Claims, 7 Drawing Sheets

(56) References Cited

U.S. PATENT DOCUMENTS

| | | | |
|---|---|---|---|
| 7,697,412 | B2 | 4/2010 | Anderson et al. |
| 7,697,449 | B1 | 4/2010 | Shirali et al. |
| 7,787,572 | B2 | 8/2010 | Scharf et al. |
| 7,848,463 | B2 | 12/2010 | Li et al. |
| 7,995,688 | B2 | 8/2011 | Hong et al. |
| 8,064,507 | B1 | 11/2011 | Cheng et al. |
| 2004/0219883 | A1 | 11/2004 | Pauli et al. |
| 2005/0075845 | A1 | 4/2005 | Thomas et al. |
| 2005/0105647 | A1 | 5/2005 | Wilhelmsson et al. |
| 2005/0135509 | A1 | 6/2005 | Mantravadi et al. |
| 2005/0147026 | A1 | 7/2005 | Jones, IV et al. |
| 2005/0180364 | A1 | 8/2005 | Nagarajan et al. |
| 2006/0029279 | A1 | 2/2006 | Donoho |
| 2006/0153283 | A1 | 7/2006 | Scharf et al. |
| 2006/0291578 | A1 | 12/2006 | Singh et al. |
| 2007/0280363 | A1 | 12/2007 | Im et al. |
| 2008/0117995 | A1 | 5/2008 | Anderson et al. |
| 2008/0130771 | A1 | 6/2008 | Fechtel et al. |
| 2008/0151989 | A1 | 6/2008 | Von Elbwart et al. |
| 2008/0228446 | A1 | 9/2008 | Baraniuk et al. |
| 2010/0002574 | A1* | 1/2010 | Kim et al. .............. 370/210 |
| 2010/0002788 | A1 | 1/2010 | Wu et al. |
| 2010/0272194 | A1 | 10/2010 | Zhengang et al. |
| 2010/0284478 | A1 | 11/2010 | Liao et al. |
| 2011/0069796 | A1 | 3/2011 | Scharf et al. |
| 2011/0096767 | A1 | 4/2011 | Narayan et al. |
| 2011/0122789 | A1 | 5/2011 | Haustein et al. |
| 2011/0142118 | A1 | 6/2011 | Seo et al. |
| 2012/0020427 | A1 | 1/2012 | Butussi et al. |
| 2012/0114085 | A1* | 5/2012 | Kim et al. .............. 375/346 |

FOREIGN PATENT DOCUMENTS

| | | |
|---|---|---|
| JP | 2008-536359 | 9/2008 |
| JP | 2009-081535 | 4/2009 |
| WO | WO 2007/149297 A1 | 12/2007 |
| WO | WO 2008/136184 | 11/2008 |
| WO | WO 2010/090787 A1 | 8/2010 |
| WO | WO 2011/066271 | 6/2011 |

OTHER PUBLICATIONS

Jia, et al., "Improved Channel Estimation Method Based on Time-Domain Processing for OFDM Systems", *Wireless Communications, Networking and Mobile Computing, IEEE International Conference*, pp. 13-16, (Sep. 21, 2007).

Lin, et al., "A Novel Channel Estimation Method Using Virtual Pilots in MIMO OFDM Systems", *IEICE Transactions on Communication*, E91-B(11):3764-3767 (Nov. 2008).

Sun, et al., "A Time Domain Iteration-based Channel Estimation Method in OFDM System with Null Subcarriers", *2010 IEEE Vehicular Technology Conference*, pp. 1-5 (May 16-19, 2010).

Werner, et al., "Low-Complexity Time-Domain Channel Estimators for Mobile Wireless OFDM Systems", *Proc. IEEE Workshop on Signal Processing System Design and Implementation, IEEE*, pp. 245-250 (Nov. 2, 2005).

Werner, et al., "Combined Frequency and Time Domain Channel Estimation in Mobile MIMO-OFDM Systems", *2006 IEEE International Conference on Toulouse*, France, p. IV373-IV376 (May 14-19, 2006).

Abari, et al., "Low complexity channel estimation for LTE in fast fading environments for implementation on multi-standard platforms," IEEE, Vehicular Technology Conference, Sep. 6-9, 2010, pp. 1-5.

Arslan, et al., "Interference mitigation and awareness for improved reliability," Reliable Communications for Short-range Wireless Systems, 2011, pp. 190-233, Cambridge University Press, United Kingdom.

Berger, et al., "Sparse Channel Estimation for Multicarrier Underwater Acoustic Communication: From Subspace Methods to Compressed Sensing," IEEE, Signal Processing, Mar. 2010, pp. 1708-1721, vol. 58, Issue 3.

Berger, et al., "Sparse Channel Estimation for OFDM: Over-Complete Dictionaries and Super-Resolution," IEEE Signal Processing Advances in Wireless Communications, 2009, Jun. 21-24, 2009, pp. 196-200.

Blumensath, et al. "Gradient Pursuits," IEEE, Signal Processing, Jun. 2008, pp. 2370-2382, vol. 56, Issue 6.

Budiarjo, et al., "On the Use of Virtual Pilots with Decision Directed Method in OFDM Based Cognitive Radio Channel Estimation Using 2x1-D Wiener Filter," IEEE, Communications, May 19-23, 2008, pp. 703-707.

Candes, "Compressive sampling," Proceedings of the International Congress of Mathematicians, 2006, pp. 1-20, Madrid, Spain.

De Baynast, et al., "Chip-level LMMSE Equalization for Downlink MIMO CDMA in Fast Fading Environments," IEEE Global Telecommunications Conference, Nov. 29-Dec. 3, 2004, pp. 2552-2556, vol. 4.

Doukopoulos, et al., "Robust Channel Estimation via FFT Interpolation for Multicarrier Systems," IEEE, Vehicular Technology Conference, Apr. 22-25, 2007, pp. 1861-1865.

Edfors, et al. "Analysis of DFT-Based Channel Estimators for OFDM," Wireless Personal Communications, 2000, pp. 55-70, vol. 12.

Edfors, et al., "OFDM Channel Estimation by Singular Value Decomposition," IEEE Communications, Jul. 1998, pp. 931-939, vol. 46, Issue 7.

Fornasier, et al., "Compressive Sensing," Apr. 18, 2010, pp. 1-49.

Haimovich, et al. "An Eigenanalysis Interference Canceler," Jan. 1991, vol. 39, No. 1.

Hoeher, et al., "Two-Dimensional Pilot-Symbol-Aided Channel Estimation by Wiener Filtering," IEEE, Acoustics, Speech, and Signal Processing, Apr. 21-24, 1997, pp. 1845-1848, vol. 3.

Huang, et al., "Kalman-filter-based channel estimation for orthogonal frequency-division multiplexing systems in time-varying channels," IET, Communications, Aug. 2007, pp. 795-801, vol. 1, Issue 4.

Kinjo, "Time domain channel estimation schemes for OFDM systems with multiple antenna transmissions," IEEE, Intelligent Signal Processing and Communication Systems, Jan. 7-9, 2009, pp. 232-235.

Le Saux, et al., "Robust Time Domain Channel Estimation for Mimo-OFDM Downlink System," Electrical Engineering, 2007, pp. 357-366, vol. 1.

Maechler, et al., "Implementation of Greedy Algorithms for LTE Sparse Channel Estimation" Signals, Systems and Computers (ASILOMAR), Nov. 7-10, 2010, pp. 400-405.

Maechler, et al., "Matching Pursuit: Evaluation and Implementation for LTE Channel Estimation," IEEE, Circuits and Systems (ISCAS), May 30-Jun. 2, 2010, pp. 589-592.

Mallat, et al., "Matching Pursuits With Time-Frequency Dictionaries," IEEE, Signal Processing, Dec. 1993, pp. 3397-3415, vol. 41, Issue 12.

Özbek, et al., "Pilot-Symbol-Aided Iterative Channel Estimation for OFDM-based Systems".

Ozdemir, et al. "Channel Estimation for Wireless OFDM Systems," IEEE Communications, 2007, pp. 18-48, vol. 9, No. 2.

Pati, et al., "Orthogonal Matching Pursuit: Recursive Function Approximation with Applications to Wavelet Decomposition," Signals, Systems and Computers, Nov. 1-3, 1993, pp. 40-44, vol. 1.

Rinne, et al, "Pilot Spacing in Orthogonal Frequency Division Multiplexing Systems on Practical Channels," IEEE, Consumer Electronics, Nov. 1996, pp. 959-962, vol. 42, Issue 4.

Saeed, et al., "MIMO OFDM Channel Estimation Based on RLS Algorithm: the Time-versus Frequency-domain Implementations," Communications, 2007. Asia-Pacific Conference on Communications, Oct. 18- 20, 2007, pp. 547-550.

Schafhuber, et al., "Adaptive Wiener Filters for Time-Varying Channel Estimation in Wireless OFDM Systems," IEEE, Acoustics, Speech and Signal Processing, Apr. 6-10, 2003, pp. 688-691, vol. 4.

Tauböck, et al., "A Compressed Sensing Technique for OFDM Channel Estimation in Mobile Environments: Exploiting Channel Sparsity for Reducing Pilots," IEEE, Acoustics, Speech and Signal Processing, Mar. 31-Apr. 4, 2008, pp. 2885-2888.

(56) References Cited

OTHER PUBLICATIONS

Van De Beek, et al. "On Channel Estimation in OFDM Systems," Vehicular Technology Conference, Jul. 25-27, 1995, pp. 815-819, vol. 2.

Wan, et al., "The Modified Iterative Detector/Estimator Algorithm for Sparse Channel Estimation," OCEANS 2010, Sep. 20-23, 2010, pp. 1-6.

Wang, et al., "A New Channel Estimation Method Based on Distributed Compressed Sensing," IEEE, Wireless Communications and Networking Conference, Apr. 18-21, 2010, pp. 1-4.

Wu, et al., "Channel Estimation for OFDM Systems with Subspace Pursuit Algorithm," ICGCS, Green Circuits and Systems, Jun. 21-23, 2010, pp. 269-272.

Yücek, et al., "A Comparative Study of Initial Downlink Channel Estimation Algorithms for Mobile WiMAX," IEEE, Xplore Digital Library, Mar. 25-29, 2007, pp. 32-37.

Zhao, et al., "A Novel Channel Estimation Method for OFDM Mobile Communication Systems Based on Pilot Signals and Transform-Domain Processing," IEEE $47^{th}$ Vehicular Technology Conference, May 4-7, 1997, pp. 2089-2093, vol. 3.

* cited by examiner

BLOCK TIME DOMAIN CHANNEL ESTIMATION IN OFDM SYSTEM

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. This notice applies to the software and data as described below and in the drawings.

BACKGROUND

1. Field of the Invention

The present invention relates to a system and a method for processing communication signals to more efficiently achieve channel estimation, particularly in providing channel estimation in an orthogonal frequency division multiplexing (OFDM) receiver.

2. Description of the Related Art

To increase data rates and mitigate multipath, advanced networks including so-called 4G wireless networks such as WiMAX and LTE (long-term evolution) have adopted variations of the orthogonal frequency division multiplexing (OFDM) waveform for their PHY layer. The PHY layer is the physical, electromagnetic means by which bits of information are transmitted and received over the air or wire. OFDM offers much sought-after bandwidth efficiency, with a built-in mitigation for the multipath of the wireless channels in urban environments. The sensitivities of OFDM transmission are well-understood. The "bit-pump" scheme for the PHY layer has proven successful in digital subscriber line (DSL, wired) OFDM applications. On the other hand, mobile wireless OFDM applications still face challenges to achieve OFDM's designed capacity.

At the core of the practical and theoretical advantages of OFDM is the use of a fast Fourier transform (FFT). The FFT implemented in OFDM can be viewed as analogous to a bank of tuners for $N_c$-simultaneous radio stations because each of the tones generated by the FFT can be independently assigned to users. The OFDM PHY provides or receives a simultaneous blast, over a short period of time, of bits on each carrier frequency (tone) with a complete, or partial, allocation of carriers to a given user. Making a partial allocation of carriers among different users and aggregating many users within one period is one multiple-access scheme for OFDM. In the case of 10 MHz bandwidth channels, a user can be receiving up to $N_c$=840 (WiMAX) or 600 (LTE) simultaneous tones, over a very short duration, such as 0.1 milliseconds. These $N_c$-tones per period of time make up an OFDM symbol. The allocation of many users in one symbol is called OFDMA.

Wireless standards usually consist of three important time segments, defined by the bandwidth available and the information's time sensitivity. Symbols are concatenated to define a frame, which is the longest relevant unit of time and for example might be one millisecond. If the standards assign ten symbols to a frame, then the symbol duration is 0.1 milliseconds. Finally, the FFT size and cyclic prefix (CP) duration define the time spacing between samples, so a 1024 point FFT and 128 point CP define a sampling interval of 11 microseconds. Although FFT computations can be comparatively efficient, the FFT size for an exemplary OFDM system is sufficiently large (e.g., 1024 samples in the 10 MHz bandwidth case) that computational demands remain rather high and power consumption remains an important constraint in designing receivers for user handsets.

OFDM systems are more sensitive and have less robust signal acquisition than 3G systems based on code division multiple access (CDMA). The sensitivity of OFDM systems comes from their use of the fast Fourier transform (FFT) to transform incoming signals from the time to frequency domain. The FFT in OFDM systems can deviate from ideal assumptions under very common real-world conditions and receiver implementations. If the assumptions underlying the FFT algorithm fail, cross talk develops between all of the $N_c$-channels (on $N_c$ carriers) being transmitted. Crosstalk between carriers degrades performance, which in turn causes bit error rates (BER) to increase.

A wireless OFDM handset may receive multiple paths (copies with different delays) of the same signal from a transmission tower ("base station") due to reflections from structures or large water surfaces. This non-line-of-sight reception or multipath causes the signal to be distorted from the flat frequency domain "shape" output by the transmitter. A receiver must compute a filter to restore the signal to its original flat spectral shape; that filter is said to equalize the signal. OFDM receivers perform a critical equalization computation for each OFDM symbol transmitted.

OFDM, unlike most other modulation strategies commonly used in communication systems, can include two equalizers to improve signal quality: a time equalizer (TEQ) and a frequency equalizer (FEQ). Some OFDM applications such as DSL include a time equalizer while others, such as systems that implement current wireless standards, do not demand a time equalizer. All practical OFDM receivers have a frequency equalizer. Whether a receiver includes a time equalizer or only a frequency equalizer, the receiver needs to perform channel estimation to at least initially determine values of the equalizer coefficients before the equalizer can be used to improve the signal quality. Determining the coefficients for frequency equalizers typically is performed in the frequency domain.

An OFDM communication system typically includes an OFDM transmitter that generates radio signals modulated with information such as data generated by a computer network or voice data. The radio signal travels to a receiver over a channel that distorts the radio signal in various ways, including by transmission over multiple paths of different lengths, introducing multiple copies of the radio signal with different offsets and amplitudes in the mechanism known as multipath. Receiver circuitry down converts the received signal to baseband and then analog-to-digital converts that signal to produce the information signal that is subject to OFDM processing. The radio signal is aligned temporally. Following alignment, the signal is processed to remove the cyclic prefix (CP) from the signal. The cyclic prefix is present because OFDM transmitters add a CP of length $N_{CP}$, which consists of the last $N_{CP}$ samples, to an information signal waveform of length N so that the digital signal that the transmitter converts to analog and transmits is of length $N+N_{CP}$. An initial step of the receiver's reverse conversion process then is to remove and discard the added $N_{CP}$ cycle prefix samples. Following that step, a serial to parallel conversion element organizes and converts the serial signal into a parallel signal for further processing. The cycle prefix can be removed either before or after the serial to parallel conversion.

After CP removal the parallel data is provided to a fast Fourier transform (FFT) processor that converts the time domain samples $s(n)$ to a set of frequency domain samples $R_i(k)$ for processing. The received OFDM symbol is assumed to be corrupted by the channel, which is assumed for OFDM to introduce amplitude and phase distortion to the samples from each of the carrier frequencies used in the OFDM system. A frequency equalizer (FEQ) applies an amplitude and phase correction specific to each of the frequencies used in the OFDM system to the various samples transmitted on the different frequencies. The FEQ needs an estimate of the channel's amplitude and phase variations from ideal at each frequency to determine what corrections to apply.

A typical OFDM channel estimator receives and estimates in the frequency domain a channel based on a set of pilot tone locations and received pilot signals. This is termed frequency domain channel estimation or FDCE. The pilot tones (or just pilots) are typically one or two bit symbols dictated by the relevant standards so that the receiver knows the expected pilot locations and values a priori. All FDCE implementations react to the OFDM symbol output by the FFT to extract the received pilot signals. The channel estimate at each pilot may be determined as the amplitude and phase rotation from the ideally expected post-demodulation value of "+1" for each pilot. Any deviation from this "+1" value constitutes the distortion from the channel at that frequency's bandwidth. The value of the channel at the data carrier frequencies can be estimated by interpolating the values obtained at the pilot carrier frequencies. Various improvements on simple channel estimation schemes are known and are conventionally implemented in the frequency domain. The frequency equalizer receives the signals from the fast Fourier transform processor and the channel estimates from the estimator and equalizes the signal. The output of the equalizer typically is provided to a parallel to serial element that converts the parallel outputs of the equalizer to a serial output user signal.

An OFDM symbol is constructed by setting active data carrier values to non-zero values from a prescribed set of values according to the number of bits to be "loaded" into that OFDM symbol. These values are then subjected to an inverse fast Fourier transform (IFFT) to obtain the time-domain samples. The cyclic prefix is appended to the beginning of the symbol by taking a defined number of samples from the end of a symbol's sequence of time-domain samples. The IFFT might, for example, produce 1024 samples. Certain standards select the CP to have length 128. That means the transmitter selects the last 128 samples from the sequence of 1024 samples and pre-pends those samples so that they become the first 128 samples in the transmitted OFDM symbol, which has a total of 1152 samples. Because of this construction, selecting any 1024 samples out of the 1152 samples of the OFDM symbol produces a circular shift on the original 1024 OFDM time domain samples.

In the case of the WiMAX standard, the OFDM symbol can be transmitted on 60 subchannels with 14 active carriers per subchannel, for a total of 840 active carriers, with 4 pilots per subchannel. The locations of the pilots in any given symbol, and therefore subchannel, are prescribed by the standard. OFDM schemes for high-throughput networks seek to minimize the overhead, and this includes the number of training carriers within a symbol. Reducing the number or density of pilots can limit the ability of receivers to efficiently recover information from a signal.

One theoretical advantage of OFDM is that equalization can be performed after the FFT for each received tone individually through a rather simple algorithm. Another advantage that enables OFDM receivers is that equalizer coefficients need only be estimated for each subcarrier that is relevant to the user, a quantity smaller than the FFT size. The values for each equalizer coefficient corresponding to each tone will depend on the estimation of the channel coefficient—termed channel estimation. Like many operations in OFDM receivers, typical OFDM receivers perform channel estimation after the FFT because the channel estimation at that point is performed simply and efficiently based on a user's tone allocation. Because channel estimation is performed after the FFT, the tones will be impacted by FFT and post-FFT distortions, known as inter-carrier interference (ICI). ICI generally manifest through three conditions: 1) errors in frequency tuning; 2) doppler from mobility; and 3) interference from other cell-sites. OFDM systems accommodate inter-symbol interference by providing a time gap between symbols, so that inter-symbol interference generally is of less concern for OFDM as compared to other wireless schemes.

Any given channel has a well-known limit to its capacity. In current OFDM implementations, there are additional losses in capacity below the expected rates. Channel estimation errors are a principal culprit. Since ICI affects the channel estimation algorithms post-FFT in typical implementations, poor channel estimation leads to inaccurate equalizer coefficients. Increased bit error rate (BER), due to myriad conditions such as demanding channels and poor channel estimation, can be accommodated by reducing the transmitted bit rate offered to a user. In effect, reducing the transmitted bit rate allows for robustness against interference. However, this is a non-linear correction, since the OFDM scheme allows for transmission of two, four or six bits per tone and consequently, under some circumstances, mitigating distortion requires fewer than 2 bits per tone be transmitted, which means the system makes no data available to the user at all.

SUMMARY OF THE PREFERRED EMBODIMENTS

An aspect of the present invention provides an OFDM receiver that determines a time domain channel impulse response. The receiver comprises a filter that receives OFDM symbols, performs comb filtering and puncturing of OFDM symbols to provide punctured OFDM symbols having pilot information. Punctured OFDM symbol storage receives and stores a predetermined number of punctured OFDM symbols. A virtual pilot generator is coupled to the punctured OFDM symbol storage to generate virtual pilot information introduced to OFDM symbols. A time domain channel estimator processes a first OFDM symbol including virtual pilot information to generate a channel impulse response for the first OFDM symbol. A frequency equalizer equalizes the OFDM symbol in response to the channel impulse response for the first OFDM symbol.

BRIEF DESCRIPTION OF THE DRAWINGS

FIG. 5 may, for example, be generated by introducing virtual pilots to the FIG. 4 subframe that has undergone a puncturing process.

DETAILED DESCRIPTION OF THE PREFERRED EMBODIMENTS

Figure 1:
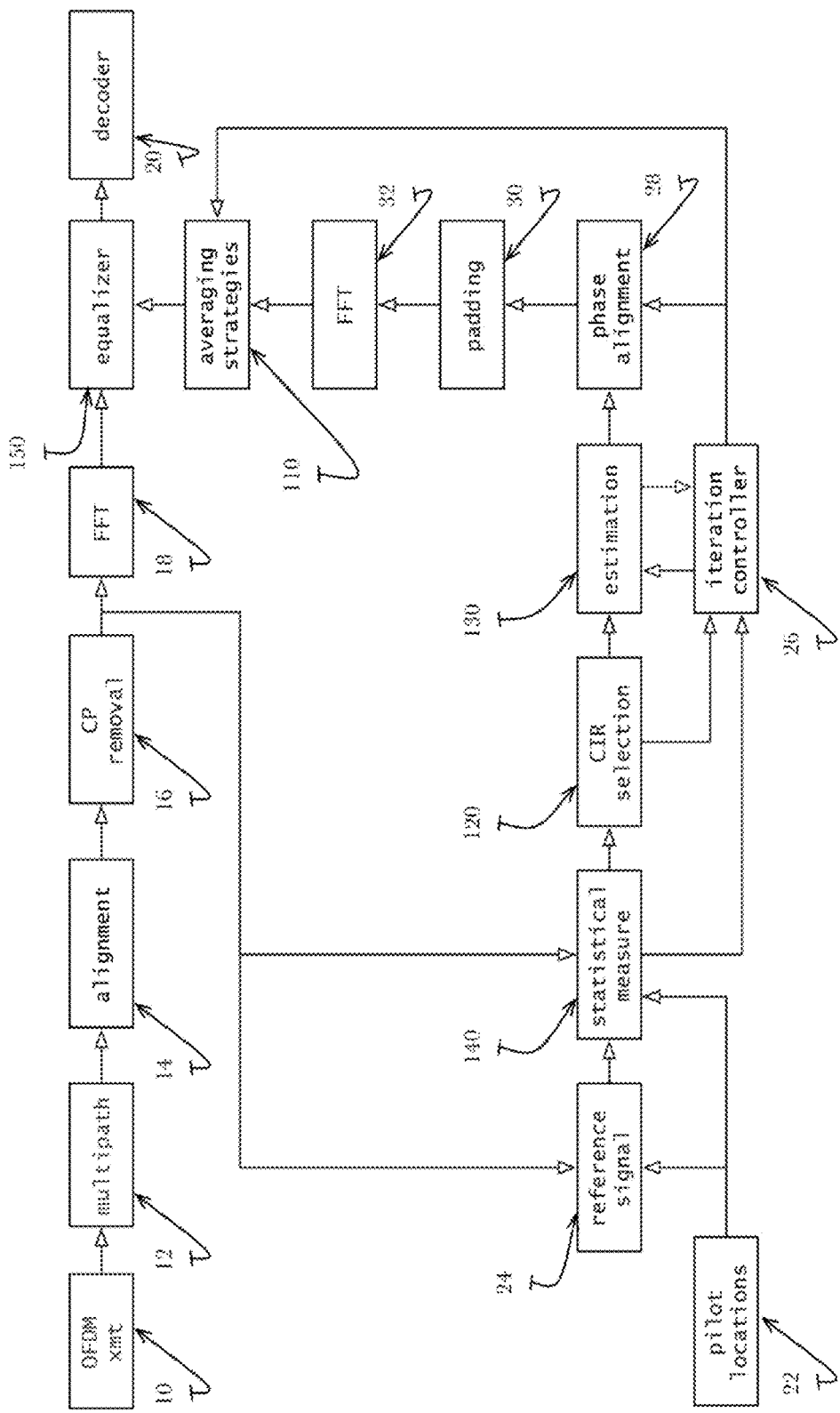
FIG. 1 schematically illustrates an OFDM communication system including an OFDM transmitter and a time domain channel estimation OFDM receiver.

A typical OFDM receiver includes a simple frequency domain channel estimator (FDCE) functionally co-located with the frequency equalizer. The FDCE uses the frequency representation of the OFDM symbol and possibly other information to estimate the channel on a per-symbol, or block-symbol, basis. The equalizer coefficients are single complex-valued weights for each active carrier. In multiple access schemes, the carriers devoted to a single user typically are a subset considerably smaller than all active carriers. For example, in one LTE configuration, 600 carriers are available for the downlink to a user, but as few as 36 may be allocated to that user. Channel estimation can therefore be effectively calculated in groups of 12 neighboring frequencies. In a multiple access OFDM implementation, estimating the channel at the receiver only for one user can provide useful simplification.

Time domain channel estimation (TDCE) offers significant advantages over frequency domain channel estimation (FDCE) in complex network designs or for high user densities. The increased robustness provided by time domain channel estimation translates into higher network-wide throughput. The original WiFi standard (802.11a) employing OFDM may not realize performance gains from implementing time domain channel estimation, but deployments of TDCE in receivers implementing the comparatively complex LTE (long-term evolution) standard can achieve greatly improved throughput and an improved user experience.

One challenge in time domain channel estimation is that there may be too few pilot carriers in any given symbol to perform effective channel estimation. In a block-symbol transmission scheme there has to be a minimum pilot density to enable time domain channel estimation. Standards like LTE are designed for frequency domain channel estimation and do not necessarily provide sufficient pilot signals in one symbol for time domain channel estimation. Not all symbols in a given block have pilot carriers and the pilot density in pilot-bearing symbols may be insufficient for robust time domain channel estimation.

Preferred aspects of the present invention can provide robust time domain channel estimation by, for example, increasing the pilot density for block-symbol OFDM transmission systems such as LTE. LTE typically provides fourteen symbols in any given group, and pilots are typically included in four of these symbols. The aggregate of fourteen symbols is termed a subframe. The subframe duration is 1 ms and each carrier spans 15 KHz. An LTE system using a 10 MHz bandwidth channel may use a 1024 point FFT with 600 active carriers. This implies that the transmission over 1 ms distributes the necessary information for transmission from the base station to the mobile user in as many as 600×14=6240 carrier intervals. These intervals are termed "resource elements" in LTE. In some LTE configurations there are too few pilots within the symbols that make up the subframe, which can lead to convergence and estimation accuracy problems, among other issues. Preferred implementations of the present invention provide the effective equivalent of a number of additional pilots (virtual pilots) that can substantially improve the feasibility and performance of time domain channel estimation. In addition, processing of the channel impulse response can yield a better framework for channel estimation, also improving feasibility and performance of time domain channel estimation. This discussion next provides an overview of an appropriate receiver suitable for implementing and taking advantage of time domain channel estimation.

FIG. 1 highlights the functionality of a time domain channel estimation receiver for symbol-by-symbol processing within an OFDM communication system. The FIG. 1 OFDM communication system includes an OFDM transmitter 10 that generates radio signals modulated with information such as data generated by a computer network or voice data. The radio signal travels over the channel 12 to a preferred implementation of a TDCE OFDM receiver. Channel 12 distorts the radio signal in various ways, including by transmission over multiple paths of different lengths, which introduces multiple copies of the radio signal with different offsets and amplitudes in the mechanism known as multipath. The radio signal is down converted and input to an alignment element 14 that aligns the signal temporally so that it can be processed according to transmission standards. Following alignment, the data is passed to a processing element 16 that removes the cycle prefix (CP) from the signal. Following that step, a serial to parallel conversion element organizes and converts the serial signal into a parallel arrangement for further processing. The cyclic prefix can be removed either before or after the serial to parallel conversion.

After CP removal 16 the parallel data is provided to a fast Fourier transform (FFT) processor 18 that converts the time domain samples s(n) to a set of frequency domain samples Ri(k) for processing. The received OFDM symbol is assumed to be corrupted by the channel, which is assumed for OFDM to introduce amplitude and phase distortion to the values at each of the subcarrier frequencies used in the OFDM system. A frequency equalizer 150 can apply amplitude and phase correction specific to each of the subcarrier frequencies used in the OFDM system for the various samples transmitted on the different frequencies. The correction applied by the FEQ 150 preferably uses a channel estimate of the channel's amplitude and phase variations from ideal with the channel estimate preferably provided in the time domain. Certain preferred implementations of the FIG. 1 TDCE receiver determine a channel estimate for every received OFDM symbol. Other preferred implementations use statistical measures to provide robust functionality against known impairments. The equalized symbol output by the frequency equalizer 150 is provided to the decoder 20, which processes the symbol to extract the transmitted data.

Pilot locations element 22 stores and outputs a set of pilot signal locations and modulation values according to the standard considered. Pilot locations element 22 may output pilot signal locations corresponding to the symbols and subcarriers that the appropriate communication standard dictates as having pilot signals. When desired, the pilot locations element 22 also outputs virtual pilot locations in addition to and preferably generated from the pilot signal locations and values dictated by the standards. The additional virtual pilot signals provide increased pilot signal stimulus that can be used by responsive elements to generate more accurate outputs, which can provide greater stability. Reference signal element 24 preferably is responsive to pilot location information output by pilot locations element 22 and more preferably is responsive to the actual and virtual pilot locations and modulations to generate a reference signal with increased pilot signal location stimulation. In some implementations, the pilot locations element 22 will output for each actual and virtual pilot location phase and amplitude information associated with actual and virtual pilot signal locations in the frequency domain. Other circuitry such as the reference signal element 24 could provide one or more of these data sets, depending on how the circuitry is implemented and the sophistication of the implementation, or one or more of these data sets might not be needed in certain implementations. The reference signal generated by element 24 may be a time domain signal or may be a frequency domain signal as desired. The reference signal output by element 24 can be selected for correlations between the reference signal and either a time domain or a frequency domain received signal.

One approach that can be used in the FIG. 1 OFDM receiver is to obtain an initial estimate of the time domain channel impulse response (CIR), which is advantageously determined by a statistical measure. Typically, this statistical measure is the correlation between a reference signal provided by module 24 and the received symbol. This calculation may be carried out in a statistical measure module 140 that performs a preferred correlation between the reference signal and the received signal to generate an initial channel impulse response. Two additional preferred processes remain: to select the time span with the significant channel paths, preferably derived from the initial estimate, and to estimate the channel to provide the channel estimate to the equalizer. The initial channel impulse response is output to the CIR selection module 120 to select the time span capturing the significant channel paths.

Figure 2:
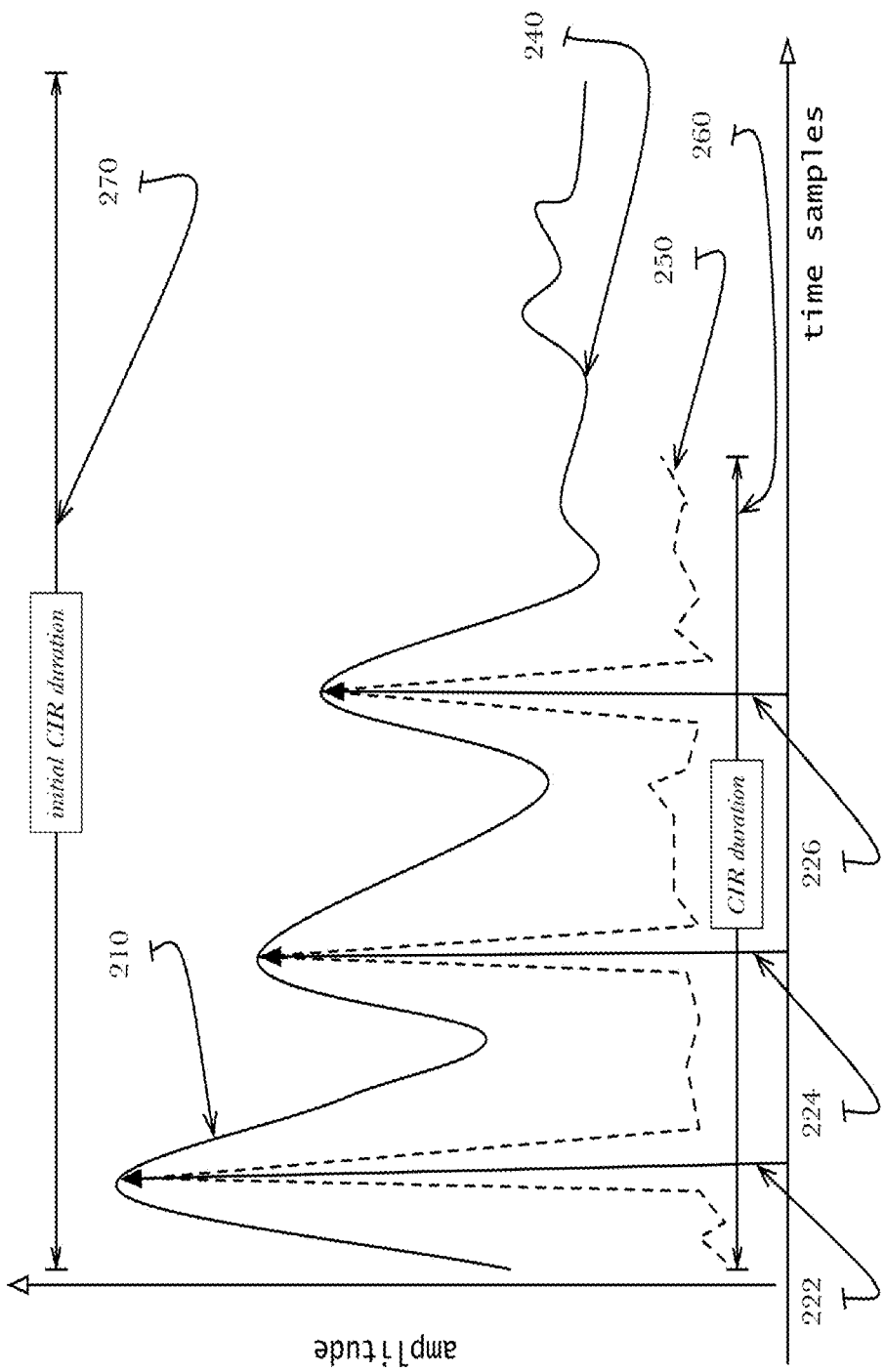
FIG. 2 illustrates an initial channel estimate, a final channel estimate and an idealized channel representation.

CIR selection module 120 is designed to process a vector of values from an initial channel estimate (initial CIR) and output a shorter vector with an estimate of the time window that contains the significant paths in the channel. Generally the CIR selection module is intended to select the best window including the information about the significant paths without capturing undesired noise or requiring the processing of an undesirable quantity of samples. FIG. 2, curve 240, shows an initial estimate for a three-path channel. The initial CIR waveform 240 has the initial CIR duration indicated at 270 in FIG. 2 consisting of M samples arranged in a vector. The true channel impulse response (CIR) is represented in FIG. 2 as the three paths 222, 224 and 226. A receiver preferably can be programmed to set the value for the number M of samples that make up the initial time domain channel estimate 240. Preferably the number M of samples is chosen to exceed the target CIR duration 260 of L samples. That is, the CIR selection module 120 preferably determines which L samples that comprise the CIR duration 260 to select from the M samples in the initial CIR duration 270, with L<M. Preferably the CIR selection module 120 selects the L samples that best represent the CIR where the significant paths in the channel are present. Typically, M does not exceed the number of samples in an OFDM symbol.

FIG. 2 shows three curves of interest that determine the robustness and performance of a preferred OFDM receiver implementing time domain channel estimation. The first curve is the initial channel estimate 240, the second curve is the achievable channel estimate 250 and the third curve is the set of three paths 222, 224 and 226 that make up the actual channel. The estimate of curve 240 is inadequate to achieve a target bit error rate when compared to simple channel frequency responses (CFR) estimators. The correlation the statistical measure module 140 performs to establish an initial estimate does not have near-orthogonal properties at other than zero-lags in its auto-correlation response. This is unlike other transmission schemes that use orthogonal codes, such as code division multiple access (CDMA) in the WCDMA standard, which utilize spread spectrum theory and a set of orthogonal codes. Indeed, OFDM is characterized by rather poor auto-correlation properties demonstrated by the "broad" peaks shown in the initial channel estimate curve 240. For theoretically-ideal CDMA spreading codes and lengths, that same correlation to generate the initial channel estimate may be closer to that of curve 250.

CIR selection module 120 preferably uses the initial CIR estimate response 240 to select the L samples for the preferred CIR duration out of the M samples that make up the initial CIR 240 and that span the initial CIR duration 270. Estimation module 130 preferably uses this initial CIR to determine a best CIR estimate. Suitable channel estimators are described, for example, in U.S. patent application Ser. No. 13/416,990, "OFDM Receiver with Time Domain Channel Estimation," filed Mar. 9, 2012, which application is incorporated by reference in its entirety. Estimation module 130 is capable of "removing" the non-orthogonal correlation properties of an OFDM symbol. The output of the estimator 130 is shown in FIG. 2 as the estimated CIR curve 250. This CIR estimate 250 outperforms typical OFDM receivers with FDCE implementations, under conditions that do not violate FDCE's assumptions about the OFDM symbol and the channel conditions. One such fundamental assumption is that the actual channel duration, the delay time span between the first 222 and furthest significant path 226, does not exceed the cyclic prefix length. Violation of the cyclic prefix duration constraint, while detrimental to FDCEs, is of significantly lesser consequence to the time domain channel estimation (TDCE) methods preferred here. Provided that the statistical measure module 140 considers this potential condition, the CIR selection 120 and estimator 130 are capable of providing a highly accurate estimate of the true channel. This violation of the cyclic prefix duration constraint is expected to occur in some network configurations for near-future LTE deployments.

In certain preferred embodiments of an OFDM receiver, the CIR selector 120 preferably selects a portion of the initial CIR for further processing to develop a channel estimate or may otherwise achieve a channel estimate with a length shorter than the symbol length or the length of the initial CIR. Such preferred embodiments may, for example, utilize metrics that characterize the channel to advantageously determine a shortening of the initial CIR that is beneficial to the time domain channel estimation in terms of complexity, robustness and accuracy. An appropriate metric to evaluate the CIR duration might be generated, for example, by the iteration controller 26 or might be generated by another element of the FIG. 1 receiver responsive to the channel.

Preferred embodiments of the FIG. 1 receiver incorporate an iteration controller 26 to control the number of iterations of the channel estimator 130. Preferably the iteration controller element 26 receives and considers information from one or more of the CIR selector 120, which outputs an initial channel estimate, the statistical measure element 140 and the channel estimator 130. The iteration controller 26 and the channel estimator 130 preferably work in conjunction to achieve desired channel estimation performance, under varying pilot configurations in training and/or pilot/data mixed symbols. The iteration controller 26 is advantageous to computational methods that exploit second order moment measures, such as correlations and auto-covariance matrices for channel estimation in channel estimator 130. Direct computations of these formulations are comparatively less likely to be numerically stable, and thus iteration methods preferably are employed. For this reason, metrics and other quality measures preferably are processed to determine a sufficient number of iterations or, for example, a maximum number of such iterations.

Under many circumstances, the channel estimator 130 does not provide a CIR that is properly aligned for equalization. Preferably then, the phase alignment module 28 is responsive to metrics from the iteration controller module 26 to properly adjust the CIR to match the frequency-domain phase of the corresponding OFDM symbol being processed by the TDCE receiver. After phase alignment, the channel estimate is extended or padded to have a proper length for further processing. For example, padding element 28 may insert trailing zeros to make the channel estimate have the proper length. Next the fast Fourier transform element 30 transforms the time domain channel estimate to the frequency domain for use by the frequency equalizer 150. Additional information about the structure, characteristics and operation of the circuits shown in FIG. 1 can be found in U.S. patent application Ser. No. 13/416,990, "OFDM Receiver with Time Domain Channel Estimation," filed Mar. 9, 2012, which application is incorporated by reference in its entirety for all purposes.

FIG. 1 illustrates a TDCE OFDM receiver that assumes two key operational conditions: (1) each symbol processed has a mix of data and pilot carriers; and (2) there are sufficient pilots in any given symbol to enable convergence of the estimation 140 method. In the case where not all symbols have pilots, then some type of averaging strategy 110 is preferably used to provide a channel estimate for data-only symbols (i.e., a symbol that does not contain pilots and contains only data). On the other hand, these two key operational conditions may not exist in typical LTE configurations unless the virtual pilot strategy discussed below is incorporated.

FIG. 2 highlights certain issues for OFDM receivers using time domain channel estimation. First, it is desirable for the receiver to accurately and precisely determine the CIR duration and which of the initial CIR samples are within the CIR duration. Second, it is desirable for the receiver to obtain an estimated CIR 250 that most closely resembles the true channel, shown as three paths (222, 224, and 226) in FIG. 2. The preferred receiver implements a method for CIR selection 140 and estimation 120 modules to achieve the desired result shown in FIG. 2 when the OFDM symbols are assembled in blocks.

Aspects of the present invention provide advantageous implementations of time domain channel estimation and have particular application to "block-OFDM" symbol systems. Implementations are capable of providing high accuracy and robustness for realistic mobile environments even with a low density of pilot signals.

Figure 3:
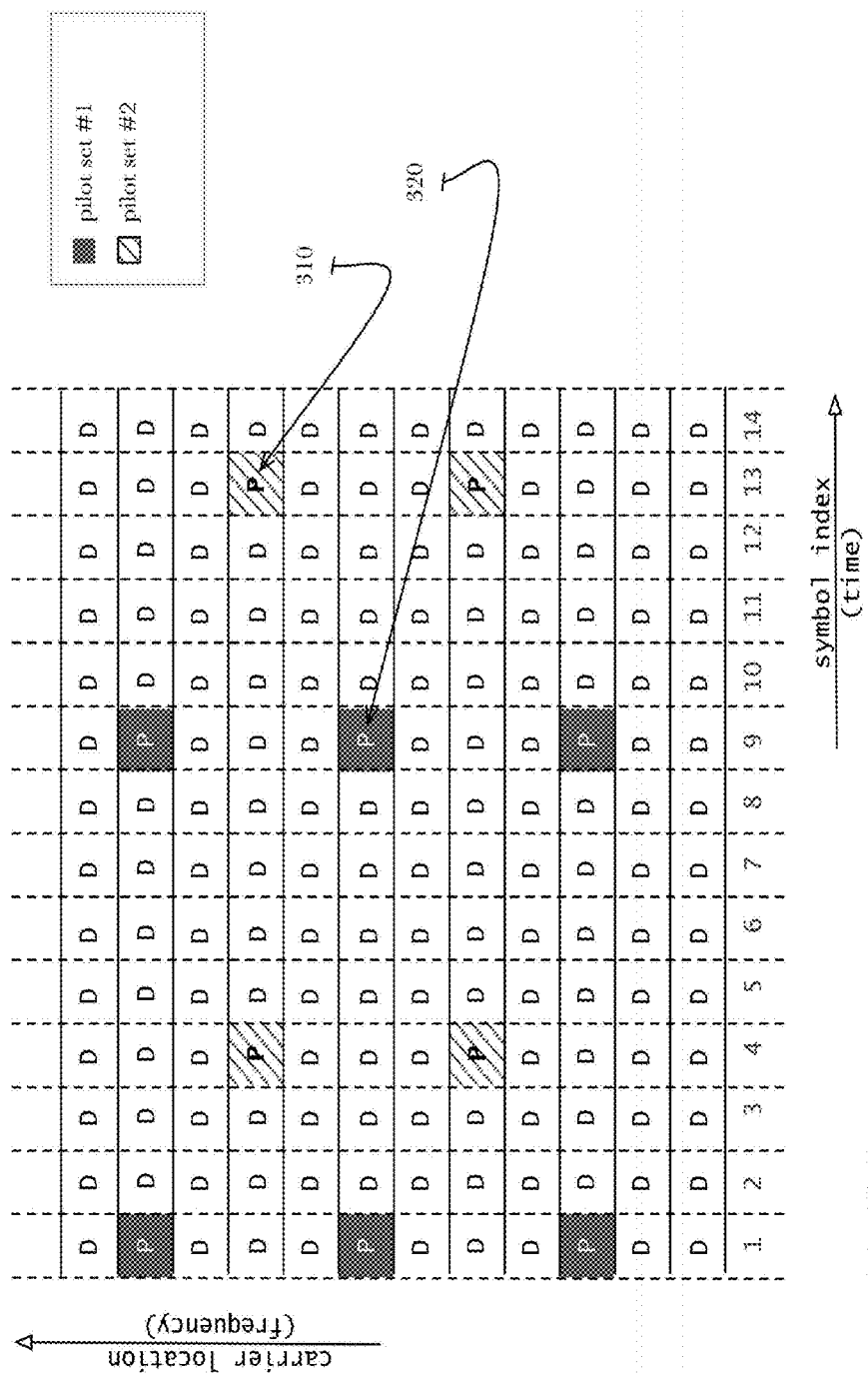
FIG. 3 illustrates schematically the distribution of pilot carriers and data carriers in a fourteen symbol subframe according to the long-term evolution (LTE) standard.

In LTE, the transmission of information bits to a user is segmented over a number of carriers and a number of consecutive symbols. While the LTE configuration may have K total carriers in use by a base station, the user may be allocated a number significantly less than K. The K total carriers in an LTE configuration are subdivided into groups of $K_{RB}$ contiguous carriers. $K_{RB}$ is the number of carriers in what is called a resource block (RB), and a user may be allocated a number of non-contiguous RBs. In the example where K=600, KRB=12, for a total of 50 RBs in one symbol arranged along the frequency axis. Typically, LTE also has time-axis allotments, which are generally segmented into "subframes" of 1 ms in duration, so that 14 OFDM symbols are present in each subframe. Ten subframes make up one frame. FIG. 3 shows a possible segmentation and arrangement of an LTE subframe in time and frequency, with 14 symbols distributed across the time axis.

FIG. 3 illustrates the pilot signal density in an LTE subframe, which is seen to consist of three pilots in two symbols (#1 and #9), and two pilots in two other symbols (#4 and #13). Each set of pilots, denoted by their representation 310 and 320, are located at different frequencies. This pattern may be repeated in subsequent subframes. In terms of pilot density, there are 10 pilots in 168 total active carriers, which can lead to convergence and accuracy problems, among other issues. Preferred implementations of the present invention provide the effective equivalent of a number of additional pilots (virtual pilots) that can substantially improve the feasibility and performance of time domain channel estimation. In addition, the time domain channel estimation receiver preferably uses an estimated CIR duration that is closely matched to the true CIR duration. This discussion next provides an overview of an appropriate strategy suitable for implementing and taking advantage of virtual pilots in time domain channel estimation.

Comb Filtering and Puncturing

For a preferred time domain channel estimation receiver to identify the channel with the highest possible accuracy, the receiver preferably increases the pilot density and preferably "comb filters" the received symbols to remove data carriers. The simplest of "comb filter" implementations use an FFT. This is because the function of a comb filter is to break a signal into components, analogous to a filter bank, which can be readily implemented with an FFT or other transforms (e.g., DCT, wavelets, etc.). Once the received symbol is transformed, the known data carrier intervals can be nulled, for example by zeroing the received amplitudes, to produce a punctured symbol better suited for channel estimation.

Figure 4:
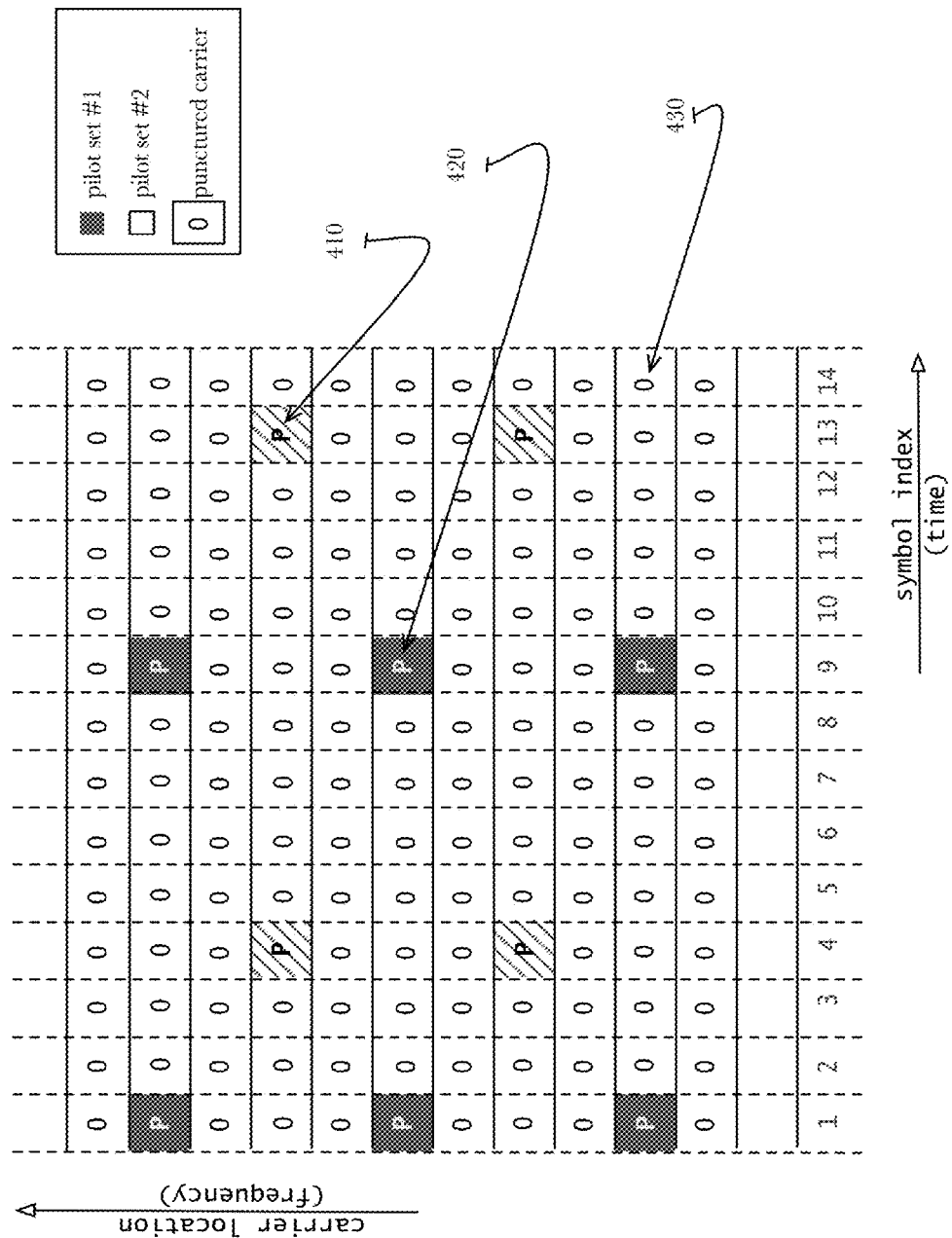
FIG. 4 illustrates schematically the distribution of pilot carriers and data carriers of FIG. 3 after a puncturing operation that may, among other possibilities, null or zero the data carriers within a subframe.

Because the OFDM symbol preferably is converted from the time to frequency domain, the receiver preferably applies the comb filter in the frequency domain to null the data carriers. This nulling of the signal values at the data carrier locations can be termed "puncturing." Accordingly, the block of received symbols in FIG. 3 is preferably comb-filtered to isolate the individual carriers, followed by nulling or puncturing the data carriers to yield the subframe and symbols as illustrated in FIG. 4. In this illustration, all carriers modulated with data bits are set to a value of zero, or punctured, as shown in the changes from the example of the carrier and time index located at 430. All pilot locations are effectively multiplied by 1, and all data locations are multiplied by zero, or the most efficient implementation to achieve a puncturing result such as that illustrated in FIG. 4. It should be noted that carrier offset, doppler due to mobility, and other received imperfections, will cause cross-talk among neighboring channels. Puncturing ignores these effects, however, because channel estimation can acceptably ignore cross-talk among frequency carriers. Other strategies may be pursued, which may enhance puncturing by, for example, filtering the three contiguous carriers before puncturing is performed. Such enhanced strategies may be particularly desirable as determined by the sensitivities of the OFDM communication system under consideration.

In some situations it is advantageous to multiply the data by zero, and the pilots by the conjugate of their known transmit values. For these situations, the pilot locations, post conjugate-multiply of their transmit value, represent a value of the sampled channel at the frequency of the pilot. The specific implementation of the statistical measures module 140, or an equivalent module that produces an initial time domain channel estimate, will determine the appropriate multiplier for the pilots in FIG. 4.

Virtual Pilots

After comb filtering and puncturing of data carriers as in FIG. 4, each OFDM symbol preferably is processed to increase the pilot density through the introduction of virtual pilots. The pilots transmitted have sampled the channel, and are of sufficient density for interpolation to other strategically chosen locations to effectively increase the pilot signal (tone) density in a given block of OFDM symbols. This increase in pilot density facilitates convergence of preferred time domain channel estimation strategies so that those strategies are capable of high estimation accuracy.

Various strategies are available to interpolate the channel estimate at the pilot locations to provide channel estimates at data carrier locations. A preferred implementation uses a two-dimensional Wiener filter implementation to estimate the virtual pilot values (phases and amplitudes) at the selected locations based on the measured pilot values and standard-defined positions in the block. Alternately, the interpolation can be implemented more simply with two-dimensional Weiner filters, which avoid the estimation of frequency-axis correlations, and use only the doppler and SNR estimates to perform a one-dimensional Wiener filter. When the receiver generates estimates of the doppler bandwidth and/or the signal to noise ratio (SNR), the receiver can readily determine the auto-covariance and cross-correlation vectors for the one-dimensional Wiener filter as a function of one or both of these variables, which allows a metric for the Wiener filtering.

Figure 5:
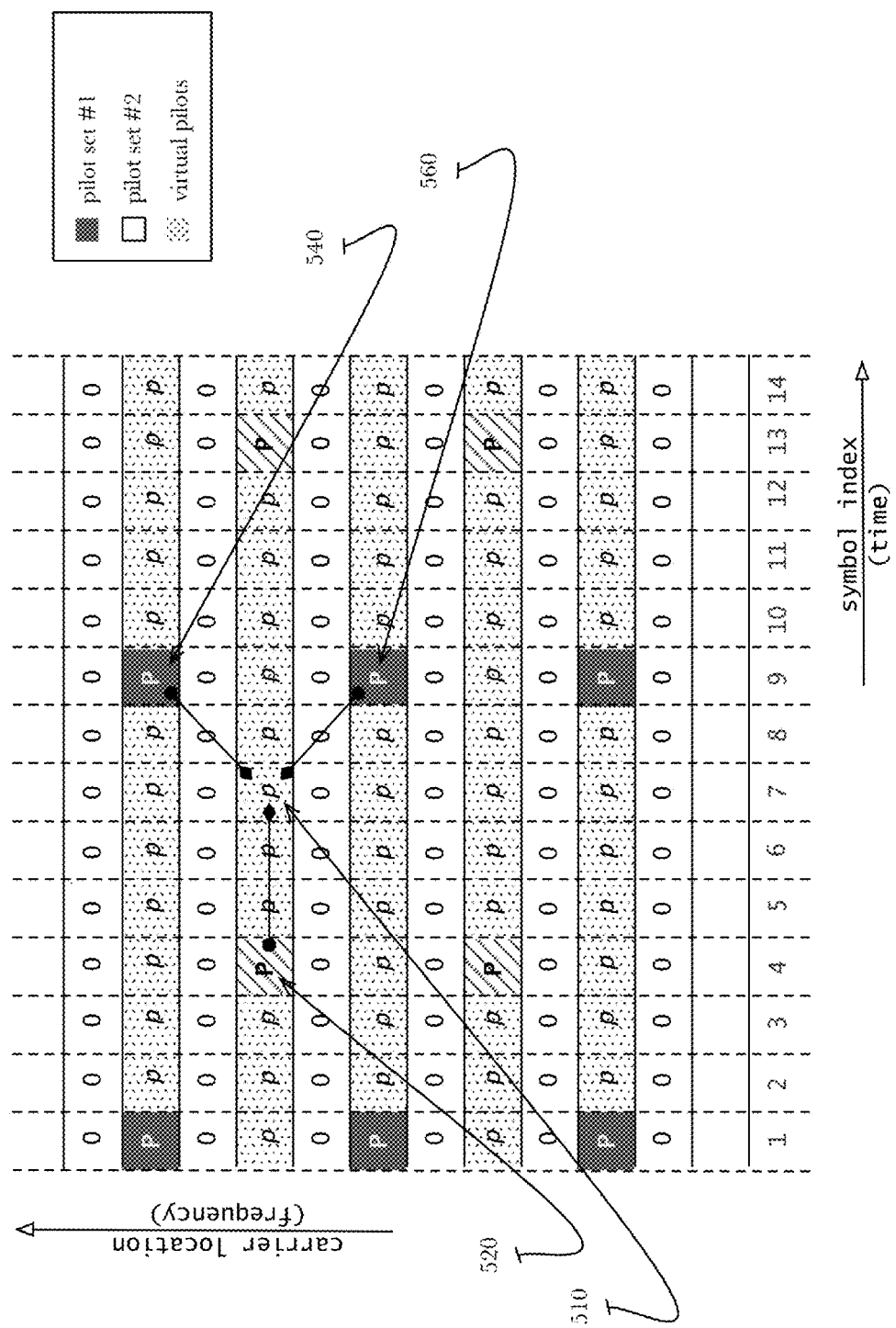
FIG. 5 illustrates a subframe processed to provide virtual pilots to facilitate time domain channel estimation.

FIG. 5 illustrates the use of known pilots in a two-dimensional grid of time and frequency of OFDM symbols to determine where to place virtual pilots at appropriate, punctured data carrier locations. There is a range of suitable variations for distributing virtual pilots at those data carrier locations zeroed by the puncturing strategy scheme described above with respect to FIG. 4. Any zeroed location in FIG. 4 can have a virtual pilot assigned to it based on the locations and value of known pilots. In FIG. 5, virtual pilots are assigned to all fourteen symbols at those five frequencies that correspond to the frequencies of the actual pilots in the received symbol.

FIG. 5 details how the virtual pilot location 510 can be assigned a (complex) value based on the interpolation from the nearest pilot locations for all sets in the OFDM block. That is, the value assigned to virtual pilot location 510 is preferably accomplished by interpolation from the nearest actual pilots at locations 540 and 560, for pilots in set #1, and location 520 for a pilot in set #2. This procedure is followed for each of the designated virtual pilot locations in FIG. 5. After determining the virtual pilot values, two results have been achieved: the pilot density has been increased from ~1/17 (in FIG. 4) to greater than 1/3 (in FIG. 5); and, there are now channel sampled values for all symbols in the processed block of OFDM symbols.

Block-OFDM Symbol Processing in TDCE

Figure 6:
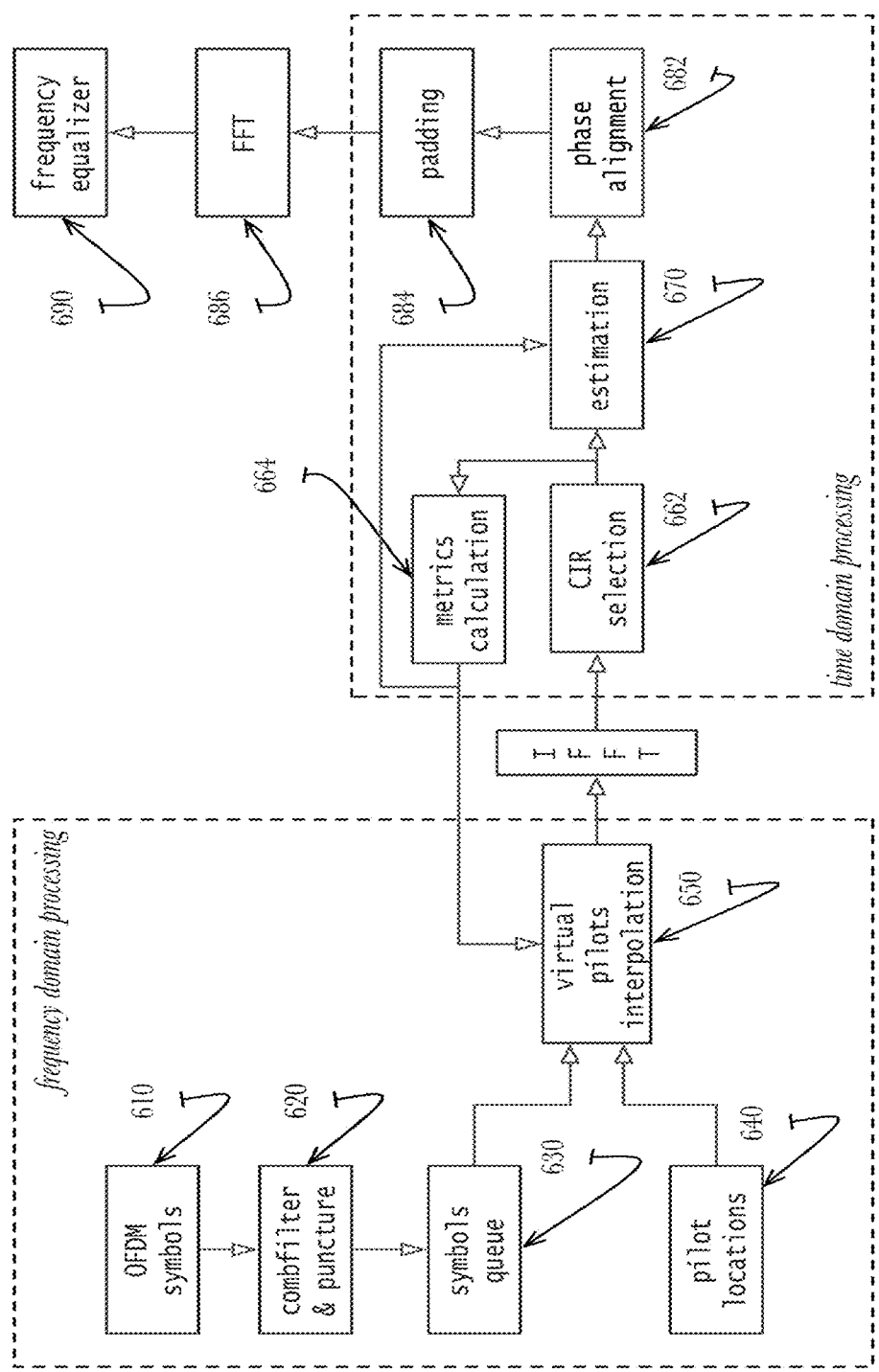
FIG. 6 illustrates circuitry for generating virtual pilot information and using that information in time domain channel estimation.

A preferred OFDM receiver with a time domain channel estimator is shown in FIG. 6. The present inventors have tested the illustrated TDCE OFDM receiver implementation using realistic simulations and observed that the receiver achieved close-to-theory performance under the adverse conditions that are assumed by known tests of CIR estimation strategies.

The present inventors have observed that sufficient pilot density within a block OFDM symbol and identification of a suitable CIR duration provide significant benefits for pragmatic implementations of TDCE OFDM receivers. Having sufficient pilot density can mean the difference between convergence or divergence of the CIR identification strategy in the time domain. Arriving at a desirable CIR duration can determine receiver performance by ensuring that no significant path is missed by the identification process while reducing the complexity of the time domain channel estimation.

The FIG. 6 receiver receives OFDM symbols 610 with already-established synchronization from the network. This helps to establish the epochs that delineate the collection of subframe symbols. The network synchronization also allows a coarse estimate for the beginning of each OFDM symbol. Comb filter and puncturing module 620 implements the comb filter and data carrier puncturing method described above to produce the result shown in FIG. 4 once a subframe is processed. At the output of module 620, filtered and punctured OFDM symbols are stored in symbols queue module 630 until a predetermined number of symbols are in the queue. Pilot locations module 640 provides temporary storage for pilot location data synchronized to the queued symbols in module 630.

Still within the frequency domain processing portion of the receiver illustrated in FIG. 6, virtual pilots interpolation module 650 reacts to the queued OFDM symbols 630, which preferably have a punctured form as illustrated in FIG. 4 for example, and the pilot locations 640 information to generate virtual pilots. Preferably the virtual pilot generation proceeds using nearest neighbor actual pilots as illustrated in FIG. 5 and discussed above. Preferred strategies for interpolation, such as two-dimensional Wiener filtering, may advantageously reduce computational complexity in determining virtual pilot values through knowledge of certain symbol metrics such as doppler and SNR estimates. Preferably, then, the virtual pilots interpolation module 650 may benefit from the estimation of the doppler and SNR parameters. As discussed more fully in the above-incorporated application Ser. No. 13/416,990, preferred embodiments of the receiver of FIG. 1 estimate doppler and SNR (SINR) metrics and so it is particularly convenient to utilize these parameters in interpolating virtual pilots, for example through two dimensional Wiener filtering.

The receiver may determine doppler and SNR metrics with strategies that depend on frequency and/or time domain OFDM symbol representations. One preferred implementation illustrated in FIG. 6 provides a metrics calculation module 664 within the time domain processing portion of the receiver to determine metrics, which may at least include doppler and SNR values. Preferably the metrics calculation 664 acts on the CIR waveform within the CIR duration 260 output by the CIR selection module 662. The CIR selection module 662 in FIG. 6 is preferably the same as the CIR selection module 120 shown in FIG. 1. These preferred metrics vary relatively slowly from symbol-to-symbol, so that the impact of computational delay is insignificant. Thus, the virtual pilots interpolation module 650 preferably reacts to values from the metrics calculation module 664, which reacts to the CIR selection module 662 waveform output within the CIR duration 260.

The Wiener filter provides a particularly preferred interpolation strategy for generating virtual pilot amplitude and phase estimates at nulled data positions from the measured pilot symbol amplitudes and phases, especially when required for the highest information throughput conditions. The Wiener-Hopf equation can determine a best unbiased estimation of an unknown parameter based on second order statistics from cross-correlation and auto-correlation statistical measures.

The Wiener-Hopf equation is of the form, $$w = R^{-1}p,$$

where R is the auto-covariance matrix, and p is the cross-correlation vector. The weights that make up vector w are used to filter, or in this case interpolate, the measured channel estimates to generate the desired virtual pilot estimates from the actual pilot locations and values. The values of R and p for such an interpolation can be estimated solely based on three parameters. Two of these three parameters, SNR and maximum doppler frequency ($f_{Dmax}$), can be measured from the CIR estimate that is the output by the channel estimation element 130. Preferably, the CIR selection element 662 is responsive to the channel estimation element 130 to generate the desired SNR and maximum doppler frequency ($f_{Dmax}$) output. The third parameter is determined by the location of the pilot-bearing symbols within the subframe, consisting of fourteen symbols in this LTE example. That is, $\Delta t$ is a static value for any given network-imposed configuration of the receiver.

Additional information about determining and storing the doppler and SNR information, along with the general operation and implementation (albeit in a slightly different application) of a two dimensional Wiener filter can be found in the previously incorporated U.S. patent application Ser. No. 13/416,990.

The waveform spanning the CIR duration 260 is the output of the CIR selection module 662 in FIG. 6. In the most basic implementation, the module 662 identifies a span of preset time duration 260 which contains the most energy from the initial estimate waveform 240. The preset time duration is determined on the basis of the operational conditions for the receiver, which trades off complexity as a function of the channels' maximum delays in the physical geometries of the receiver environment.

Figure 7:
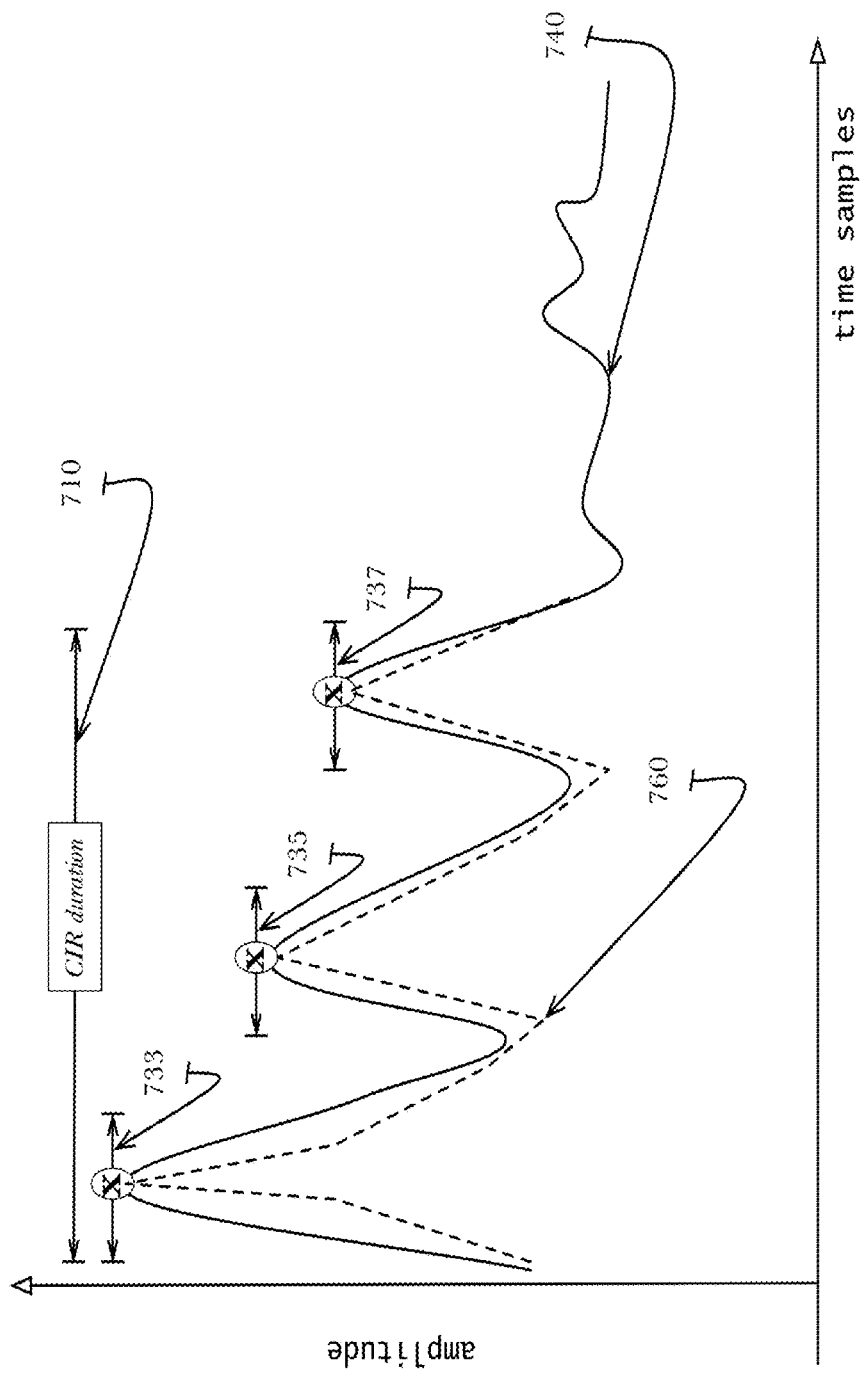
FIG. 7 illustrates aspects of a time domain channel estimation process with reference to an initial channel estimate.

A preferred implementation of CIR selection module 662 includes strategies for the selection of likely paths and to establish a time tolerance around these identified paths, from which the CIR duration 260 will be selected. FIG. 7 demonstrates a preferred procedure to be implemented within the CIR selection module 662. The module 662 preferably identifies the significant paths and preferably reduces the time duration of the initial channel estimate waveform 740 to preset target duration 710. The module 662 preferably determines likely path peaks using known analytic tools. In the example of FIG. 7, the paths are noted by an X and a tolerance time-window 733 is shown around the peaks associated with the paths. The same process is performed for the other two peaks 735 and 737. Consequently, the CIR duration 710 is determined as the span from the beginning to the end of the combined peak windows 733, 735 and 737. That is, the duration 710 is the span between the minimum time of span 733 and the maximum time of span 737.

Another aspect of the preferred receiver can be used to improve on the initial channel estimate and create an intermediate channel estimate waveform 760. While this improvement in channel estimation is of insufficient accuracy for high performance equalization, it can be helpful for convergence of time domain channel estimation strategies.

The intermediate channel estimation waveform 760 requires the CIR selection module 662 to identify paths, marked with (X) in FIG. 7, in the initial CIR estimation (curve 740) and other points in between. A preferred strategy for such identification can be found in matching pursuit schemes that react to the initial CIR estimate to partially improve upon the initial CIR estimate. An application of matching pursuit additionally enables an improved characterization of the CIR duration 710, thus improving the efficacy of the CIR estimation module 670.

To calculate an intermediate CIR, the following procedure can be implemented:

| Proc.iCIR: | 1a. | initialize: r = initialCIR; intermCIR = 0; stopping_criterion_invalid= 1; |
|---|---|---|
| | 1b. | given: stopping_criterion_threshold; |
| | 2. | while stopping_criterion_invalid do |
| | 3. | c = $P^H r$; |
| | 4. | g = argmax$_i$ |c(i)|$^2$; |
| | 5. | intermCIR (g)= intermCIR (g) + c(g); |
| | 6. | r = r − c(g)P(:,g); |
| | 7. | t = |c(g)|$^2$/mean$_i$( |c(i)|$^2$ - |c(g)|$^2$); |
| | 8. | if( t > stopping_criterion_threshold ) then |
| | 9. | stopping_criterion_invalid= 1; |
| | 10. | else |
| | 11. | stopping_criterion_valid= 0; |
| | 12. | end if |
| | 13. | end while |
| | 14. | output intermCIR | where italics in Proc.iCIR denote scalar variables, and otherwise vectors are of predefined length for estimation. The P-matrix is usually termed in the prior art as the "dictionary" for reconstruction, and in this application it consists of the first L rows of the FFT matrix, and the columns are selected to be those of the locations for the pilots. The notation P(:,g) specifies the $g^{th}$ column of the P-matrix. While the calculations of Step 3 to Step 6 in Proc.iCIR are fundamentally the matching pursuit strategy, the stopping criterion is application dependent. In the preferred embodiment to obtain the intermediate CIR, matching pursuit identifies the paths, and thus this process can be stopped, for example, using the criterion stated in Step 7 in Proc.iCIR. In effect, the stopping criterion measures the current peak to average ratio for the last-identified path against a threshold value. Thus, in the example for waveforms in FIG. 7, the Proc.iCIR could stop after a minimum of 3 iterations, and the threshold to stop the procedure is estimated for network SNR conditions as tested in a simulation environment. In some preferred implementations, the SNR may be estimated from the initial CIR estimate. Those skilled in the art can assess advantageous strategies for the stopping threshold value determination in a given standard and deployment.

The estimation module 670 preferably reacts to the intermediate channel estimation waveform 760. Such improvements from the initial channel estimate 740, clipped to fit within the time span 710, may not be feasible, and a longer convergence time may be required by the TDCE strategy implemented in module 670. Additionally, the estimation module 670 may advantageously react to further metrics calculated from the CIR selection module 662 waveform, as measured by the metrics calculation module 664. These metrics may at least include the SNR and doppler in the current symbol. Estimation module 670 is the same as the module 130 discussed with respect to FIG. 1 and may implement linear or non-linear methods and preferably uses highly-accurate iterative methods to obtain a time domain channel estimate. Similarly, the phase alignment 682, padding 684, FFT 686 and frequency equalizer 690 modules preferably are the same as the corresponding modules illustrated in FIG. 1 and as discussed above.

In FIG. 6, frequency domain processing starts with the comb filter and puncture module 620 and is applied on groupings or blocks of a predetermined number of OFDM symbols, such as the fourteen symbols illustrated in FIGS. 3-5. The FIG. 6 receiver's frequency domain processing is completed by virtual pilots interpolation module 650. The output from the virtual pilots interpolation module 650 is then transformed by the inverse fast Fourier transform (IFFT) from the frequency domain to the time domain. The FIG. 6 OFDM receiver then performs time domain processing within modules 662, 664, 670, 682 and 684 on a per-symbol basis. That is, the preferred virtual pilots interpolation module 650 uses the queued OFDM symbols 630 simultaneously to calculate virtual pilots. All other processing is individually applied to each symbol by processing one symbol at a time.

The frequency equalizer 690 uses the output of the time domain channel estimation module 670 to determine the equalization weights for the corresponding OFDM symbol. This procedure is well known. Given a system's channel frequency response (CFR), the equalizer weights are calculated as the inverse of each channel frequency response at a given carrier frequency. It is consequently desirable to align the time domain channel estimate in phase with the received symbol for an effective equalization. This is accomplished by adjusting the frequency phase shift corresponding to the time delay for the phase alignment module 682 to apply the proper phase alignment. The phase alignment module 682 reacts to the estimated CIR for a single OFDM symbol. Since the time domain channel estimator's CIR is likely to be much shorter than the OFDM symbol duration, the padding module 684 preferably pads the CIR output by the estimator 670 prior to the FFT 686 transforming the channel impulse response to its channel frequency response. Padding module 684 preferably pads the channel impulse response with zeros to extend its length to equal the FFT size. The padding module 684 reacts to the phase-aligned CIR by increasing the number of samples in the CIR through the addition of zeros.

FFT module 686 preferably reacts to the padded CIR from module 684 to compute the frequency domain channel coefficients for all active carriers in the OFDM symbol. Frequency equalizer module 690 preferably reacts to the channel frequency response output by the FFT 686 to determine the coefficient weights at the known frequency carriers to equalize the data prior to the receiver decoding the data.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What is claimed is:

1. An OFDM receiver that determines a time domain channel impulse response, the receiver comprising:
   a filter that receives OFDM symbols, the filter comb filtering and puncturing OFDM symbols to provide punctured OFDM symbols having pilot information and having at least some data information removed;
   punctured OFDM symbol storage to receive and store a number of punctured OFDM symbols;
   a virtual pilot generator coupled to the punctured OFDM symbol storage to generate virtual pilot information for a plurality of OFDM symbols based on one or more of the punctured OFDM symbols, the virtual pilot information based at least in part on the pilot information;
   a time domain channel estimator that processes a first punctured OFDM symbol including virtual pilot information to generate a channel impulse response for the first OFDM symbol; and
   a frequency equalizer that equalizes the first OFDM symbol in response to the channel impulse response for the first OFDM symbol.

2. The receiver of claim 1, wherein the virtual pilot generator performs interpolation from actual pilots to determine at least one virtual pilot value.

3. The receiver of claim 1, wherein the virtual pilot generator performs interpolation from three or more nearest neighbor actual pilots to determine a virtual pilot value.

4. The receiver of claim 1, further comprising a CIR selector responsive to an initial channel impulse response to select a channel impulse response span.

5. The receiver of claim 4, wherein the time domain channel estimator receives a shortened channel impulse response span and generates a time domain channel estimate in response to the shortened channel impulse response.

6. The receiver of claim 1, wherein the virtual pilot generator is responsive to a plurality of punctured OFDM symbols to generate virtual pilots for at least all OFDM symbols that do not have actual pilots.

7. The receiver of claim 1, wherein the first OFDM symbol is part of a block of OFDM symbols and wherein the channel impulse response is an initial channel impulse response determined over a plurality of actual and virtual pilot locations.

8. The receiver of claim 7, wherein the block of OFDM symbols includes subframes of OFDM symbols and wherein the channel impulse response is generated based on virtual pilot or actual pilot information within each subframe.

9. The receiver of claim 8, wherein each subframe includes fourteen OFDM symbols and wherein the virtual pilot generator generates virtual pilot values for each OFDM symbol within the block.

10. The receiver of claim 1, wherein the punctured symbol storage stores a predetermined number of symbols from a block of transmitted OFDM symbols before the virtual pilot generator determines virtual pilot information for the block.

11. The receiver of claim 10, wherein the virtual pilot generator identifies virtual pilot locations based on data carrier locations in the block and generates virtual pilot values based on received pilot information.

12. The receiver of claim 11, wherein the virtual pilot generator generates virtual pilot values using interpolation.

13. The receiver of claim 1, wherein the virtual pilot generator comprises a Wiener filter that generates virtual pilot values based on values of channel samples associated with pilot locations.

14. The receiver of claim 13, wherein the Wiener filter uses doppler information to generate virtual pilot values.

15. The receiver of claim 13, wherein the Wiener filter uses signal to noise ratio information to generate virtual pilot values.

16. The receiver of claim 13, wherein the Wiener filter uses doppler information and signal to noise information to generate virtual pilot values.

17. The receiver of claim 16, wherein the Wiener filter implements nearest neighbor interpolation.

18. The receiver of claim 1, wherein the virtual pilot generator generates virtual pilot values for data carrier locations using values of channel samples associated with pilot locations, the receiver further comprising a CIR selector responsive to an initial channel impulse response to select a channel impulse response interval, wherein the time domain channel estimator is responsive to the channel impulse response interval to generate a further channel impulse response.

19. The receiver of claim 18, wherein the CIR selector identifies channel paths to include within the channel impulse response interval, and the CIR selector ends a process of identifying channel paths based on a normalized peak value associated with a last identified channel path.

20. The receiver of claim 1, further comprising a CIR selector responsive to an initial channel impulse response to select a channel impulse response interval, wherein the time domain channel estimator is responsive to the channel impulse response interval to generate a further channel impulse response, wherein the CIR selector ends a process of identifying channel paths based on a normalized peak value associated with a last identified channel path.

* * * * *